(12) United States Patent
Tuzar (10) Patent No.: US 9,552,088 B2
(45) Date of Patent: Jan. 24, 2017

(54) DISPLAY DEVICE FOR A VEHICLE

(75) Inventor: Gert-Dieter Tuzar, Leichlingen (DE)

(73) Assignee: Johnson Controls Technology Company, Holland, MI (US)

( * ) Notice: Subject to any disclaimer, the term of this patent is extended or adjusted under 35 U.S.C. 154(b) by 472 days.

(21) Appl. No.: 13/700,402

(22) PCT Filed: May 27, 2011

(86) PCT No.: PCT/EP2011/058724
§ 371 (c)(1),
(2), (4) Date: Feb. 11, 2013

(87) PCT Pub. No.: WO2011/147962
PCT Pub. Date: Dec. 1, 2011

(65) Prior Publication Data
US 2013/0194228 A1    Aug. 1, 2013

(30) Foreign Application Priority Data

May 28, 2010 (DE) .......................... 10 2010 021 848
Oct. 13, 2010 (DE) .......................... 10 2010 042 376

(51) Int. Cl.
*G06F 3/041* (2006.01)
*B60K 35/00* (2006.01)
*B60K 37/06* (2006.01)

(52) U.S. Cl.
CPC ............. *G06F 3/0412* (2013.01); *B60K 35/00* (2013.01); *B60K 37/06* (2013.01);
(Continued)

(58) Field of Classification Search
CPC ................... B60K 2350/104; B60K 2350/102; B60K 2350/1024; B60K 2350/1028; B60K 2350/1048; B60K 37/06
See application file for complete search history.

(56) References Cited

U.S. PATENT DOCUMENTS 8,229,626 B2    7/2012  Medler et al.
2007/0273568 A1* 11/2007  Fujii ....................... G06F 3/045
                                                                          341/144
(Continued)

FOREIGN PATENT DOCUMENTS

DE      10323 46 7 A1    12/2004
DE      103962 38 3 T5    4/2005
(Continued)

OTHER PUBLICATIONS

Office Action dated Dec. 1, 2014, in corresponding Chinese application No. 201180035642.X and English translation, 10 pages.
(Continued)

*Primary Examiner* — Grant Sitta
*Assistant Examiner* — Amen Bogale
(74) *Attorney, Agent, or Firm* — Foley & Lardner LLP (57) ABSTRACT

The invention relates to a combined display and input device for a vehicle, wherein a virtual first input unit is provided, which is designed as a touch-sensitive screen for operating a plurality of functions and for displaying information. According to the invention, a physical second input unit is provided, wherein the functions can be selected by means of the first input unit and/or the second input unit, and target values of the functions can be set by means of the first input unit and/or the second input unit, wherein the functions and/or target values can be displayed on the touch-sensitive screen.

15 Claims, 5 Drawing Sheets

(52) U.S. Cl.
CPC .. *B60K 2350/102* (2013.01); *B60K 2350/104* (2013.01); *B60K 2350/1004* (2013.01); *B60K 2350/1024* (2013.01)

(56) References Cited

U.S. PATENT DOCUMENTS

| | | | |
|---|---|---|---|
| 2008/0174570 A1* | 7/2008 | Jobs et al. | 345/173 |
| 2009/0210110 A1 | 8/2009 | Dybalski et al. | |
| 2009/0228158 A1 | 9/2009 | Medler et al. | |
| 2010/0020042 A1* | 1/2010 | Stelandre | B60K 35/00 345/174 |
| 2010/0057273 A1 | 3/2010 | Heers et al. | |
| 2010/0175014 A1* | 7/2010 | Obradovich | B60G 17/0195 715/771 |
| 2010/0214213 A1* | 8/2010 | Bowden | B60K 35/00 345/157 |
| 2011/0025652 A1* | 2/2011 | Bonne | B60K 37/06 345/184 |

FOREIGN PATENT DOCUMENTS

| | | |
|---|---|---|
| DE | 102004031334 A1 | 1/2006 |
| DE | 102004031 65 9 A1 | 6/2006 |
| DE | 102006018 67 2 A1 | 10/2007 |
| DE | 102008041 64 9 A1 | 3/2010 |
| JP | 2005-071246 A | 3/2005 |
| JP | 2006-103363 A | 4/2006 |
| JP | 2006-117244 A | 5/2006 |
| JP | 2009-098936 A | 5/2009 |
| KR | 10-0231569 | 11/1999 |
| KR | 10-0231569 B1 | 11/1999 |
| KR | 10-2008-0110737 | 12/2008 |
| WO | WO-03/062978 A2 | 7/2003 |

OTHER PUBLICATIONS

Office Action dated Aug. 18, 2014, in corresponding Korean Patent Application No. 10-2012-7033528 and English translation, 6 pages.
German Office Action received in related case DE 10 2010 042 376.9.
International Search Report for PCT/EP2011/058724 dtd Nov. 3, 2011.
Japanese Office Action dated Feb. 4, 2014 received in corresponding Japanese Patent Application No. 2013-511698.
Korean Office Action dated Jan. 23, 2014 received in corresponding Korean Application No. 10-2012-7033528.
Office Action dated May 19, 2015, received in corresponding Japanese application No. 2014-166547 and English translation, 7 pages.
Office Action dated Oct. 13, 2015, in corresponding German application No. 10 2010 042 376.9, 8 pages.

* cited by examiner

DISPLAY DEVICE FOR A VEHICLE

CROSS REFERENCE TO RELATED APPLICATIONS

The present application is a National Stage of International Application No. PCT/EP2011/058724 filed on May 27, 2011, which claims the benefit of German Patent Application No. 10 2010 021 848.0 filed on May 28, 2010 and German Patent Application No. 10 2010 042 376.9 filed on Oct. 13, 2010, the entire disclosures of which are incorporated herein by reference.

The invention relates to a combined display and input device for a vehicle, whereby a virtual first input unit is provided, which is in the form of a contact sensitive monitor for operating multiple functions and for displaying information.

It is generally known that in the interiors of motor vehicles multiple functions are provided that can be controlled by the occupants of the vehicle. Such functions are an air conditioning system, entertainment electronics, communications means, such as for example a mobile telephone and Internet applications, as well as a navigation system.

For controlling and displaying these functions, various input devices and display devices from the prior art are known.

A display device of this type with an input device for a vehicle is disclosed in DE 10 2004 031 334 A1. The display device is coupled to a display controller for displaying information on the display device and is divided into multiple logical areas. Using the display controller, information relating to road properties, general and current traffic rules, a route and a driver of the vehicle can be displayed in a first logical area of the display device. In a second logical area, dynamic driving values of the vehicle and warning signs can be shown. The dynamic driving values include a speed of the vehicle and an engine revolution rate. In a third logical area of the display device, information relating to an air conditioning system, an infotainment system, a navigation system, a date planner, a so-called guide and a communications device can be displayed, wherein the communications device is a telephone. In a fourth logical area of the display device, the same information as in the third logical area can be displayed. The display device also comprises the input device, which is in the form of a contact-sensitive monitor, also known as a touch screen. Thus the display device and the input device form a combined display and input device.

A monitor-based vehicle operating system is also known from DE 10 2008 041 649 A1, which comprises a control device consisting of a contact-sensitive monitor and a control element. The control element covers the monitor, whereby a display on the monitor can be changed depending on functions selected using the control element.

DE 103 92 383 T5 discloses a multifunction unit for a vehicle comprising a display screen. The multifunction unit also comprises at least one mechanical button, which partly overlaps the display screen and when turned causes a change of a software-controlled representation of a function of the button on the display screen.

The object of the invention is to specify a combined display and input device for a vehicle that is improved compared to the prior art.

The object is achieved according to the invention with a combined display and input device, which has the features specified in claim 1.

Advantageous embodiments of the invention are objects of the dependent claims.

The combined display and input device for a vehicle comprises a virtual first input unit, which is in the form of a contact-sensitive monitor for controlling multiple functions and for displaying information.

According to the invention, a physical second input unit is provided, whereby the functions can be selected using the first input unit and/or the second input unit and target values of the functions can be set using the first input unit and/or the second input unit, whereby the functions and/or target values can be displayed on the contact-sensitive monitor. According to the invention, virtual control elements can also be displayed on the contact-sensitive monitor as part of the virtual first input unit, whereby the virtual control elements are switches, slide controls and/or rotary controls.

A virtual input unit is understood in the present case to be an input unit that comprises non-physical control elements. The non-physical control elements can in particular be represented as two-dimensional symbols on the contact-sensitive monitor.

A physical input unit is understood in the present case to be an input unit that comprises physical control elements, e.g. switches, buttons, rotary switches, rotary controls, slide controls, combined switches and combined controls.

The combined display and input device according to the invention for the vehicle is of simple design and enables simple and intuitive operation. The control of the various functions is carried out with a reduced number of input and display means, whereby the number in turn is not so low that their operation is too complex for an operator, in particular for a driver of the vehicle. The virtual control elements are preferably modeled on real control elements occurring in conventional vehicles, so that intuitive operation of the combined display and input device is possible.

Preferably, the contact-sensitive monitor is in the form of a resistive, capacitive or inductive contact-sensitive monitor. Such monitors are characterized by long service lives and are available at low cost. Alternatively, the contact-sensitive monitor is in the form of a sound wave-controlled device or of an optically controlled device, e.g. with an infrared light grid in front of the monitor. Its design as a so-called dispersive signal technology device is also possible.

Particularly preferably, the virtual control elements are arranged at different positions on the contact-sensitive monitor depending on the selected function. This enables a clear illustration to be achieved on the contact-sensitive monitor at all times.

In an advantageous development, the physical second input unit comprises at least one button, a rotary control, a slide control and/or a combined control, which further improve the simple operation of the combined display and input device.

The combined control is in particular a combination of a rotary control with a press switch and/or a pull switch. This enables multiple operating steps to be carried out in a very small space with a particularly small number of control elements with simultaneously intuitive control. As a result of the small number of control elements, clarity is improved and thus the operation of the combined display and input device is facilitated.

Particularly preferably, a function can be selected from multiple functions in a main menu using a rotary function of the combined control and can be chosen using a press function of the combined control, and at least one desired value of the respective function in a submenu can be set using the rotary function and/or press function of the combined control. The menu structure is characterized by a simple design which is comprehensible by the user. Operation using the combined control can be carried out in a particularly simple manner. With regards to this, it is advantageously not necessary for the operator's view to be directed towards the combined control for operation of the functions to be possible, and distraction of a driver of the vehicle from the traffic is reduced.

Alternatively or additionally, the functions in a main menu can be selected using the second input unit and subfunctions and/or the associated target values in at least one submenu can be set using the first input unit. The selection of the function whose target value is to be changed takes place in a particularly simple manner directly by operating a control element of the physical second input unit. The setting of the target values can be carried out in a particularly advantageous manner using the first input unit, i.e. using the contact-sensitive monitor. The control elements are formed and arranged on the contact-sensitive monitor depending on the function to be set, so that with a minimized number of control elements an optimal input unit adapted to the function or the target value to be set is always available, with which the target value can be accurately and simply set.

According to a particular design, multiple functions and/or target values can be displayed simultaneously and/or multiple target values of one or more functions can be set simultaneously. In doing this, multiple information items are displayed to the user simultaneously and in a clear manner, and operation is possible for the user without complex changing between a large number of menu options.

The functions, which can be selected and whose target values can be set using the combined display and input device, are in particular air conditioning functions, functions for controlling entertainment electronics, functions for controlling a communications device, functions for controlling a navigation device, functions for controlling a vehicle chassis, functions for controlling a drive train of the vehicle, functions for controlling vehicle lighting and/or functions for controlling comfort devices of the vehicle. Comfort devices include, for example, seat heating, seat ventilation and a parking heater.

Example embodiments of the invention are explained in detail below using drawings.

These show.

Parts corresponding to each other are provided with the same reference characters in all figures.

Figure 1:
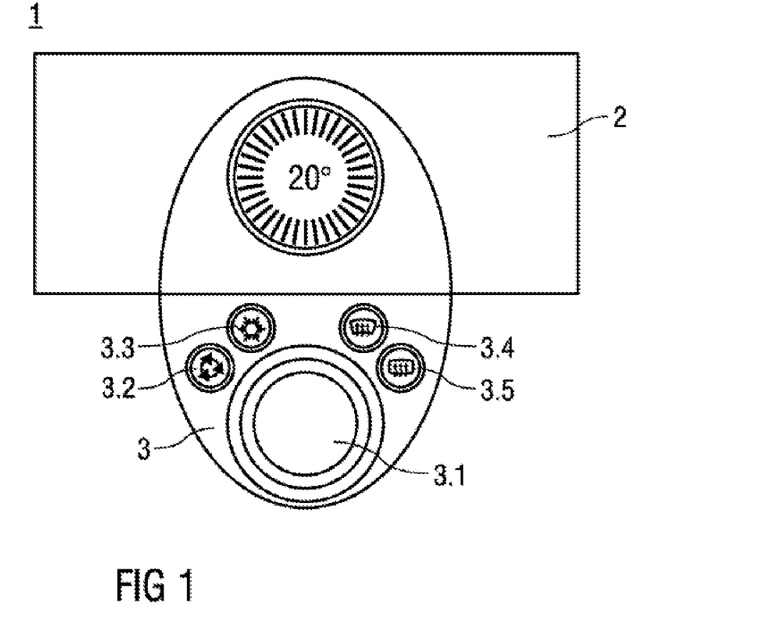
FIG. 1 schematically a first example embodiment of a combined display and input device according to the invention, FIGS. 2A through 2D schematically various states of the display and input device according to FIG. 1, FIG. 3 schematically a second example embodiment of a combined display and input device according to the invention, FIGS. 4A through 4C schematically various states of the display and input device according to FIG. 3, and FIGS. 5A through 5C schematically various states during the operation of a third example embodiment of a combined display and input device according to the invention and a sectional illustration of the combined display and input device.

FIG. 1 shows a first example embodiment of a combined display and input device 1 according to the invention, which is arranged for the display of information and for operating functions within a vehicle that is not illustrated. The illustrated example embodiment of the combined display and input device 1 is designed for the operation of an air conditioning system and for the display of information relating to the climate control of the interior of a vehicle.

The combined display and input device 1 comprises a virtual first input unit 2, which is in the form of a contact-sensitive monitor, i.e. as a so-called touch screen. The contact-sensitive monitor in the illustrated example embodiment is in the form of a capacitive contact-sensitive monitor, as a so-called Capacitive Interactive Display (abbreviation: CID). Alternatively, the contact-sensitive monitor is a resistive, inductive, sound wave controlled or optically controlled contact-sensitive monitor. It can also be designed as a so-called Dispersive Signal Technology device.

The combined display and input device 1 also comprises a physical second input unit 3, which comprises a combined control 3.1 and four buttons 3.2 through 3.5.

Using the buttons 3.2 through 3.5, various functions of the air conditioning system of the vehicle can be selected directly. A first button 3.2 is provided for activating and deactivating an air recirculation mode of a ventilation system, a second button 3.3 for activating and deactivating the air conditioning system, i.e. in particular an air conditioning compressor, a third button 3.4 for activating and deactivating an intensive ventilation means for a windscreen of the vehicle (=so-called deicing function) and a fourth button 3.5 for activating and deactivating a rear screen heater.

The combined control 3.1 consists of a combination of a rotary control with a press button and a pull button. Using the combined control 3.1, target values of specific functions of the air conditioning system can be set.

In the illustrated example embodiment, the target value of an interior temperature, here 20° C., can be set using a rotary function of the combined control 3.1 in an illustrated submenu. Changing the target temperature by means of the combined control 3.1 results directly in a change of the target value, which, for example, is specified for a temperature controller. It is also possible for the interior temperature selected by turning to be confirmed by pressing the combined control 3.1.

Alternatively, it is possible by operating the press function of the combined control 3.1 on the contact-sensitive monitor to change to a main menu or a so-called drop-down menu, in which the user can select between various functions of the air conditioning system in turn, preferably by turning the combined control 3.1. The desired function is selected by pressing the combined control 3.1. These functions are, in addition to the control of the interior temperature, control of a blower stage of the ventilation means and control of various outlet orifices of the ventilation means.

To return to the main menu it is possible as an alternative that a pull function of the combined control 3.1 can be exercised instead of the press function of the combined control 3.1.

FIGS. 2A through 2D show the combined display and input device 1 according to FIG. 1 in various states, i.e. during operation with various menu options.

The virtual first input unit 2 is arranged above the physical second input unit 3 or is above and directly connected to the physical second input unit 3.

Alternatively or in addition, an arrangement relative to one another is possible, in which the virtual first input unit 2 and the physical second input unit 3 are arranged to be adjacent, overlapping, adjacent and overlapping and/or one above the other and overlapping.

In a particularly advantageous manner, the illustration on the contact-sensitive monitor is formed so that a shape of the physical second input unit 3 is imitated or maintained in the illustration on the contact-sensitive monitor. In other words:

the illustration on the contact-sensitive monitor is carried out so that the visual illustration appears as part of the physical second input unit 3. This results in a logical, easily understood and intuitively operable arrangement for the user.

Figure 2A:
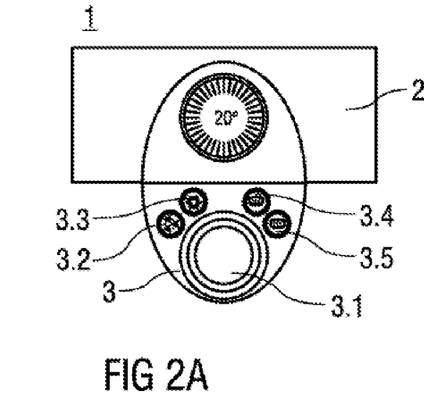

In FIG. 2A, the combined display and input device 1 according to FIG. 1 is illustrated in a submenu, in which by turning the combined control 3.1 the target value of the interior temperature can be specified. The set target value of the interior temperature is output on the contact-sensitive monitor. By pulling on the combined control 3.1 the display and input device 1 reverts to the main menu or the drop-down menu.

Figure 2B:
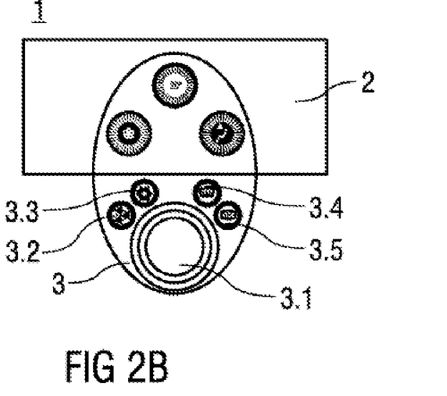

This main menu is illustrated in FIG. 2B, whereby various functions of the air conditioning system that are available for selection are shown together on the contact-sensitive monitor. The functions are, as described above, the control of the interior temperature, the control of the blower stage of the ventilation means and the control of various outflow orifices of the ventilation means, i.e. a so-called airflow distribution in the vehicle.

By turning the combined control 3.1, the desired function whose target value is to be changed can be selected, whereby a currently selected function is identified by a marking, for example a colored marking or an illumination. In the present case the function of controlling the interior temperature is selected.

Figure 2C:
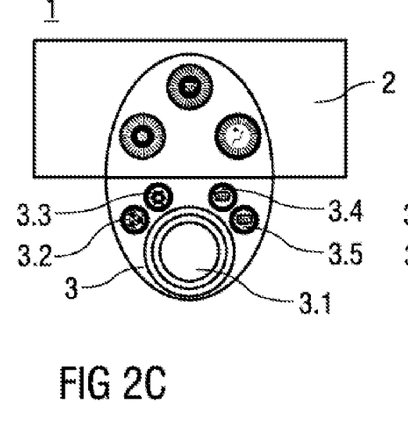

After rotation of the combined control 3.1 in the clockwise direction, as illustrated in FIG. 2C, airflow distribution control is selected.

Figure 2D:
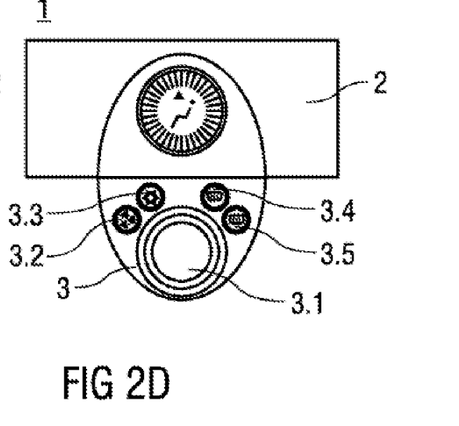

By pressing the combined control 3.1, the user enters the submenu illustrated in FIG. 2D, in which in turn the target value for airflow distribution can be specified by a turning motion of the combined control 3.1. By a pulling movement on the combined control 3.1, the combined display and input device 1 reverts to the main menu.

Figure 3:
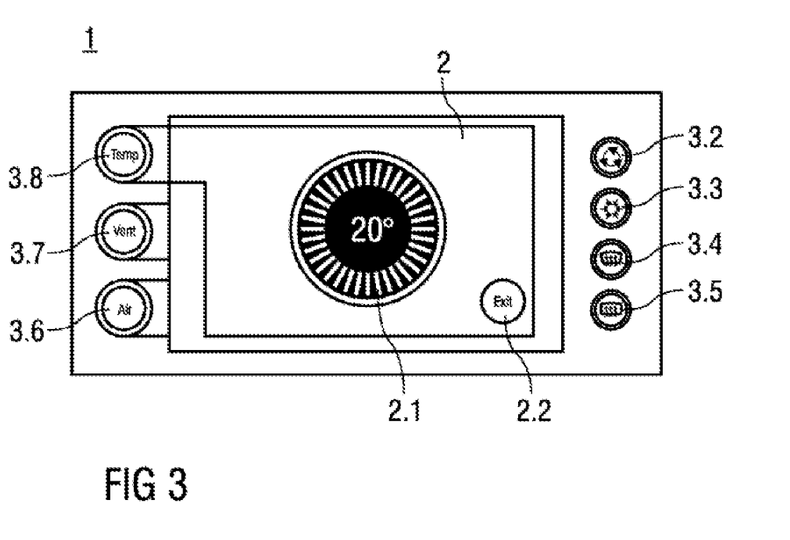

In FIG. 3, a second example embodiment of the combined display and input device 1 according to the invention is illustrated, whereby the illustrated example embodiment of the combined display and input device 1 is provided in turn for operating an air conditioning system and for the display of information relating to the climate control of the interior of a vehicle.

The physical second input unit 3 encloses the virtual first input unit 2 in a framelike manner. In a particularly advantageous manner, the frame-shaped physical second input unit 3 simultaneously forms a frame for mounting the combined display and input device 1 within the vehicle, for example for integration in a dashboard of the vehicle.

The physical second input unit 3 comprises, in addition to buttons 3.2 through 3.5, three other buttons 3.6 through 3.8, with which the functions of controlling the interior temperature (=button 3.8), the control of the blower stage of the ventilation means(=button 3.7) and the control of various outflow orifices of the ventilation means (=button 3.6) can be selected directly.

A combined control 3.1 according to FIGS. 1 and 2A through 2D is not provided. The operation carried out using the combined control 3.1 takes place on the one hand by means of buttons 3.6 through 3.8, with which the respective function is selected, whose target value is to be set.

Setting the target values takes place via the contact-sensitive monitor. Following the selection of the function, the selected function is represented symbolically on the contact-sensitive monitor. In the illustrated example embodiment, the internal temperature of the vehicle is selected as the function to be set. A first virtual control element 2.1 for setting the target value of the internal temperature can be displayed on the contact-sensitive monitor.

The first virtual control element 2.1 is a rotary control, whereby the target value of the interior temperature is set by a circular movement in the edge region of the virtual rotary control with one finger of the user or a so-called input pen.

To leave the submenu, a second virtual control element 2.2, which simulates a button, can be displayed on the contact-sensitive monitor.

In addition, a direct change to a different function is possible by operating one of the buttons 3.2 through 3.7.

Figure 5A:
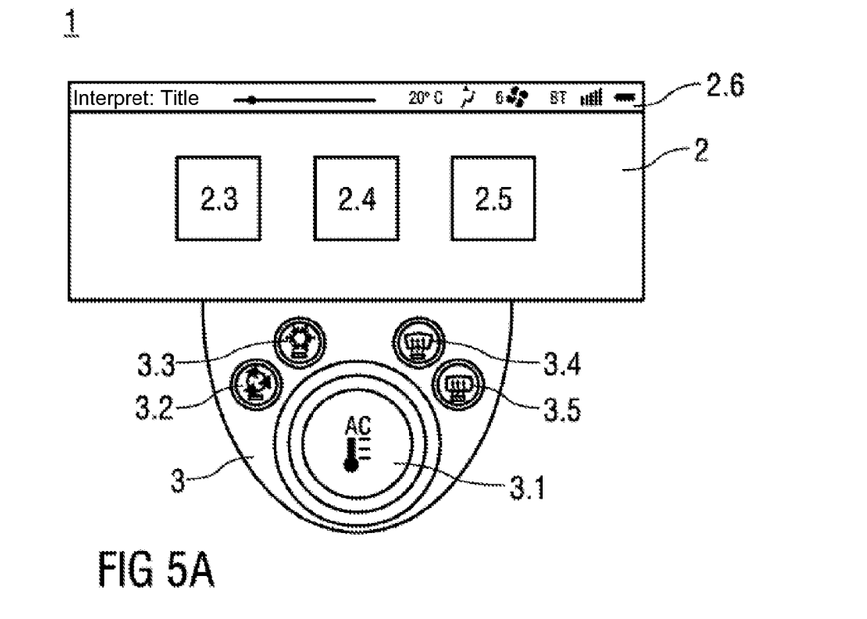
Figure 5B:
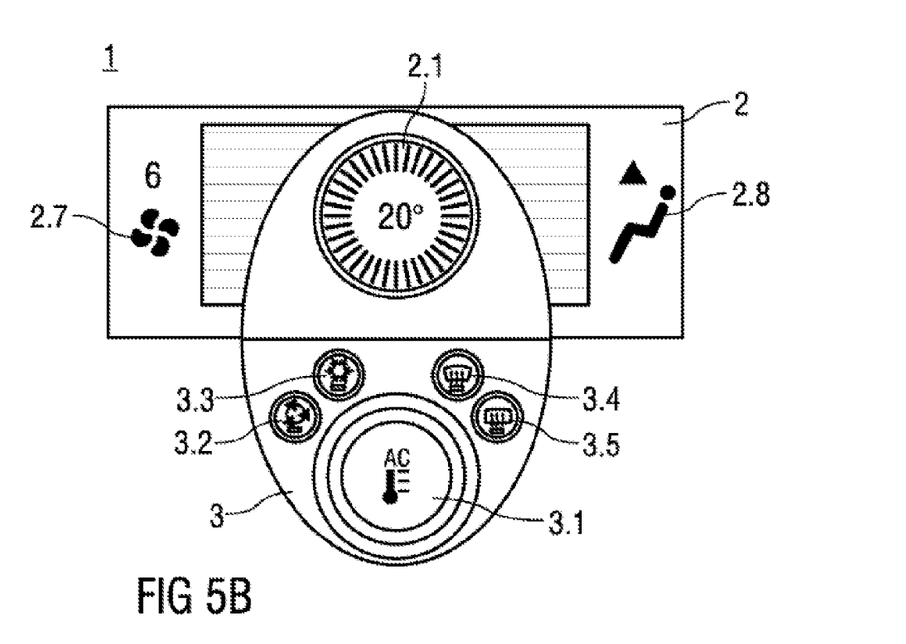
Figure 5C:
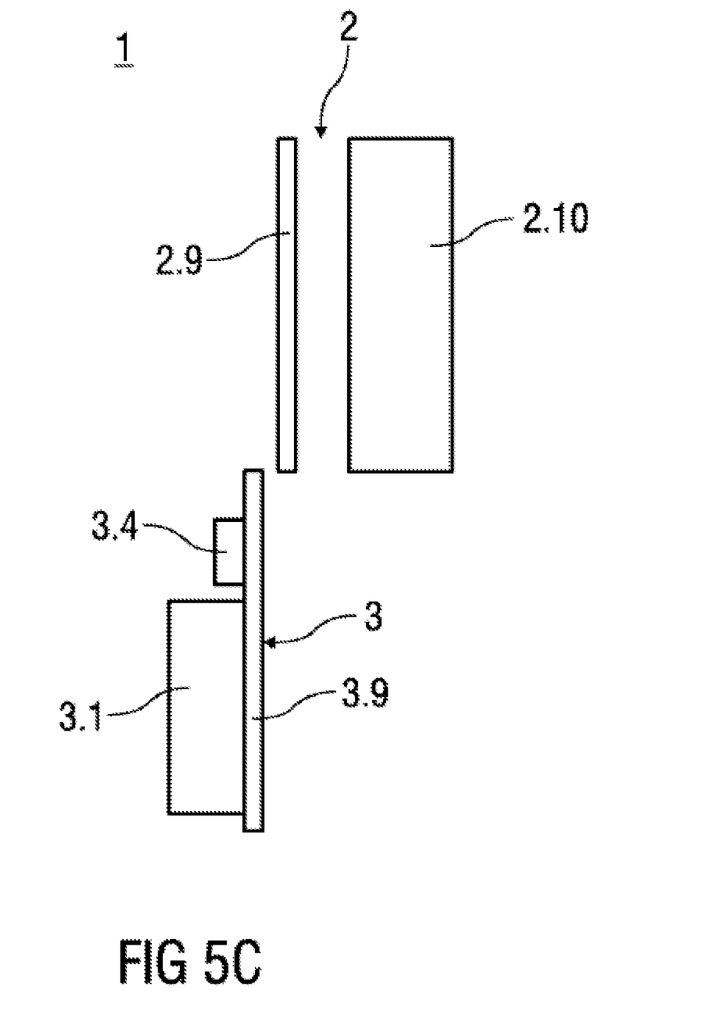

Alternatively to the frame-shaped design of the second input unit 3, the first input unit 2 and the second input unit 3 are formed by means of a common contact-sensitive layer 2.9, which is illustrated as an example in FIG. 5C. This layer 2.9 is in transparent form of glass or plastic and is in the form of a resistive or capacitive layer 2.9 in the entire area that covers a display unit 2.10 that is also illustrated in detail in FIG. 5C. On touching the layer 2.9, electrical signals are produced, with which a position of the contact can be determined and with which the first input unit 2 can be controlled.

To produce the second input unit 3, the layer 2.9 is led out laterally beyond the display unit 2.10. In the area of the illustrated buttons 3.2 through 3.8, capacitive and/or resistive sensors are introduced or formed in the layer 2.9, which on contact trigger the same actions as for operating the buttons 3.2 through 3.8. For illustration for the user, the areas in which the capacitive and/or resistive sensors are located are also preferably backlit. As a result of this design of the combined display and input device 1, this has a continuous surface, which has a high appeal and gives a high quality impression.

Figure 4A:
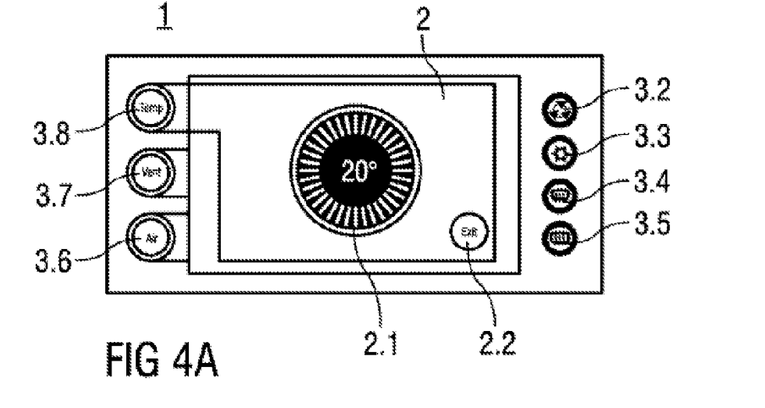

FIG. 4A shows the combined display and input device 1 according to FIG. 3 in the submenu for setting the interior temperature using circular or rotary movements in the edge region of the virtual rotary control.

Actuation of the second virtual control element 2.2 and a subsequent operation of button 3.7 are necessary to activate the function of control of the blower stage of the ventilation means. The second virtual control element 2.2 forms a termination means or a so-called exit point.

Alternatively, operation of the button 3.7 alone is sufficient to activate the function of control of the blower stage of the ventilation means.

Figure 4B:
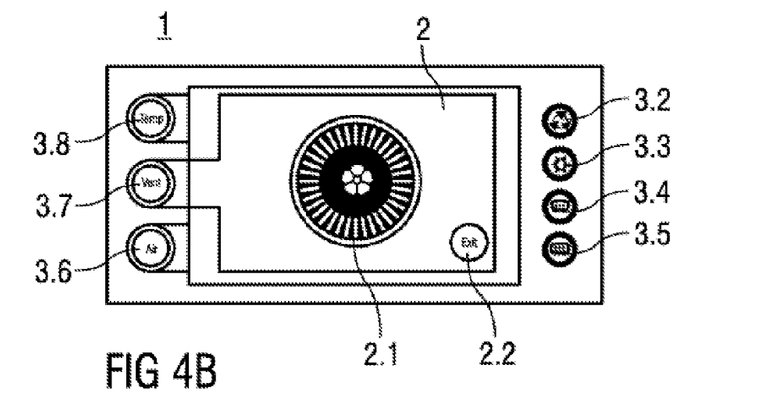

Following this selection of the function of controlling the blower stage of the ventilation means, which is illustrated in FIG. 4B, setting of the blower stage is carried out in turn by circular or rotary movement in the edge region of the first virtual control element 2.1, i.e. of the virtual rotary control.

In order to exit the function of controlling the blower stage of the ventilation means and to activate the function of controlling the various outflow orifices of the ventilation means, operation of the second virtual operating element 2.2 and a subsequent operation of the button 3.6 are necessary. Alternatively, operation of the button 3.6 alone is sufficient.

Figure 4C:
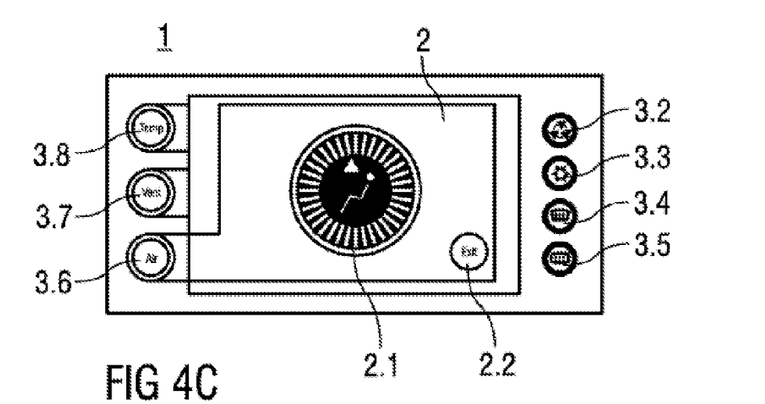

Following this selection of the control of various outflow orifices of the ventilation means, which is illustrated in FIG. 4C, setting of the air distribution is carried out by operating the first virtual control element 2.1. By operating the control element 2.1 at specific positions, the outflow orifices are activated that are located in relation to the symbolically illustrated occupants of the vehicle at the actuated position in the vehicle.

In FIGS. 5A and 5B, various states during operation of a third example embodiment of a combined display and input device 1 according to the invention are illustrated.

The combined display and input device 1 comprises in turn a virtual first input unit 2 and a physical second input unit 3.

The physical second input unit 3 comprises a combined control 3.1 and four buttons 3.2 through 3.5 according to the physical second input unit 3 illustrated in FIG. 1.

The virtual first input unit 2 is in the form of a resistive contact-sensitive monitor in the illustrated example embodiment.

Using the illustrated third example embodiment of the combined display and input device 1 according to FIG. 5A, functions of a database, functions of entertainment electronics, in particular of an audio system, and vehicle functions can be operated and/or controlled in addition to the functions of the air conditioning system of the vehicle already described in the previous figures. The vehicle functions include functions for controlling a chassis of the vehicle, functions for controlling a drive train of the vehicle, functions for controlling vehicle lighting and functions for controlling comfort devices of the vehicle.

To select the functions, three virtual control elements 2.3 through 2.5 can be output on the contact-sensitive monitor, whereby the functions of the database can be selected using virtual control element 2.3, the functions of the entertainment electronics can be selected using the virtual control element 2.4 and the vehicle functions can be selected using the virtual control element 2.5.

The virtual control elements 2.3 through 2.5 are in the form of virtual buttons, whereby an associated submenu for the respective functions, which is not illustrated in detail, is opened by touching the virtual control elements 2.3 through 2.5. Operation of the functions within the respective submenu takes place via the contact-sensitive monitor, whereby for this purpose other virtual control elements can be displayed as buttons, slide controls and/or rotary controls in a manner that is not illustrated.

These virtual control elements and the virtual control elements 2.1 through 2.5 are arranged at different positions on the contact-sensitive monitor depending on the selected function.

In the upper area of the contact-sensitive monitor, an information bar 2.6 is also displayed, with which current settings of the functions are displayed. In the illustrated example embodiment, the settings of the air conditioning system and the audio system of the vehicle are shown.

By operating the combined control 3.1, in particular by pressing it, the combined display and input device 1 changes to a menu for setting the function of the air conditioning system of the vehicle.

FIG. 5B shows this menu, whereby the function of the interior temperature, the function of the blower stage and the function of the air distribution means are symbolically illustrated together on the contact-sensitive monitor.

In the illustrated example embodiment, the interior temperature function is selected by pressing the combined control 3.1, whereby setting of the target values of the interior temperature takes place according to the description for FIGS. 1 and 2A through 2D by turning movements of the combined control 3.1. A change to one of the two remaining functions of the air conditioning system takes place by pressing the combined control 3.1 again and subsequent selection of the function by means of the rotary motion.

Alternatively or additionally, a change to submenus for setting the target values of the remaining functions of the air conditioning system is possible by touching the contact-sensitive monitor in the area of the symbols of the respective function, whereby the setting within the submenu takes place in turn in the described manner using the combined control 3.1.

Alternatively or additionally, after pressing the combined control 3.1 and opening the menu for setting the function of the air conditioning system of the vehicle, the individual target values of the function of the air conditioning system can be set by operating the virtual control elements 2.1, 2.6, 2.7 that are generated on the contact-sensitive monitor.

The first virtual control element 2.1, which is in the form of a rotary control, is provided for setting the interior temperature. The two other control elements 2.6, 2.7 are in the form of virtual buttons, whereby the setting of the target values takes place by touching the contact-sensitive monitor once or multiple times.

In FIG. 5C a sectional representation of the third example embodiment of the combined display and input device 1 is illustrated, whereby the combined display and input device 1 comprises the first input unit 2 in the form of a contact-sensitive monitor. The contact-sensitive monitor is in the form of a resistive contact-sensitive monitor, which comprises a resistive and transparent layer 2.9. This layer 2.9 produces electrical signals when touched, with which the position of the contact can be determined and with which the first input unit 2 can be controlled. For illustration and/or highlighting of individual areas of the resistive layer 2.9, it is backlit at least in some areas.

Furthermore, the first electrical input unit 2 comprises a display unit 2.10 for displaying the information, which is arranged with its surface extensions parallel to the resistive and transparent layer 2.9, whereby the display unit 2.10 is covered by the transparent layer 2.9.

The physical second input unit 3 comprises a housing 3.9. The housing 3.9 comprises apertures corresponding in a non-illustrated manner to the buttons 3.2 through 3.5 and to the combined control 3.1, through which these are led. An electrical circuit for buttons 3.2 through 3.5 and for the combined control 3.1 is arranged in the interior of the housing 3.9 in a non-illustrated manner.

REFERENCE LIST 1 combined display and input device
2 first input unit
2.1 virtual control element
2.2 virtual control element
2.3 virtual control element
2.4 virtual control element
2.5 virtual control element
2.6 information bar
2.7 virtual control element
2.8 virtual control element
2.9 layer
2.10 display unit
3 second input unit
3.1 combined control
3.2 button
3.3 button
3.4 button
3.5 button
3.6 button
3.7 button
3.8 button
3.9 housing

The invention claimed is:

1. A combined display and input device for a vehicle, comprising:
   a virtual first input unit, which is in the form of a contact-sensitive monitor for operating multiple functions in a main menu and for displaying information; and
   a physical second input unit including a combined control and at least one of at least one button, a rotary control, or a slide control;
   wherein the physical second input unit is provided adjacent to the virtual first input unit;
   wherein the combined control is a combination of a rotary control with at least one of a press switch and a pull switch;
   wherein the contact-sensitive monitor is configured to display at least one of the functions and target values;
   wherein the contact-sensitive monitor is configured to display virtual control elements as part of the virtual first input unit;
   wherein the virtual control elements comprise at least one of buttons, slide controls and rotary controls;
   wherein the rotary control of the combined control is configured to select a function from the multiple functions;
   wherein the press switch of the combined control is configured to choose the function;
   wherein at least one of the rotary control and the press switch is configured to set at least one target value of the function in a submenu; and
   wherein the contact-sensitive monitor is configured to form a visual illustration imitating a shape of the physical second input unit on the contact-sensitive monitor such that the visual illustration appears as part of the physical second input unit.

2. The combined display and input device as claimed in claim 1, wherein the contact-sensitive monitor is in the form of a resistive, capacitive or inductive contact-sensitive monitor.

3. The combined display and input device as claimed in claim 2, wherein the virtual control elements are arranged at different positions on the contact-sensitive monitor depending on the selected function.

4. The combined display and input device as claimed in claim 1, wherein the second input unit is configured to select at least one of the function in a main menu, and the first input unit is configured to set subfunctions and the associated target values in at least one submenu.

5. The combined display and input device as claimed in claim 1, wherein the device is configured to at least one of display multiple functions and target values simultaneously and set multiple target values of one or more functions simultaneously.

6. The combined display and input device as claimed in claim 1, wherein the functions are at least one of:
   air conditioning functions,
   functions for controlling entertainment electronics,
   functions for controlling a communications device,
   functions for controlling a navigation device,
   functions for controlling a chassis of the vehicle,
   functions for controlling a drive train of the vehicle,
   functions for controlling vehicle lighting and
   functions for controlling comfort devices of the vehicle.

7. The combined display and input device as claimed in claim 1, wherein the contact-sensitive monitor is arranged above the combined control.

8. The combined display and input device as claimed in claim 1, wherein the contact-sensitive monitor and the combined control are arranged to be overlapping.

9. The combined display and input device as claimed in claim 1, wherein the set target value of the function is output on the contact-sensitive monitor and is confirmed by the press function.

10. The combined display and input device as claimed in claim 1, wherein the contact-sensitive monitor is configured to display a submenu of the function in response to the press function of the combined control being used to choose the function, and the contact-sensitive monitor is configured to revert to a display of the main menu in response a pull function of the combined control.

11. The combined display and input device as claimed in claim 1, wherein the contact-sensitive monitor is configured to display at least one of a marking and an illumination in response to the function being selected by the rotary function of the combined control.

12. The combined display and input device as claimed in claim 1, wherein the virtual first input unit and the physical second input unit are formed by a common contact-sensitive layer, the virtual first input unit is configured to cover a display unit, and the physical second input unit is led out laterally beyond the display unit.

13. The combined display and input device as claimed in claim 1, wherein the contact-sensitive monitor includes a resistive and transparent layer and a display unit, wherein resistive and transparent layer covers a portion of the display unit, and the display unit is arranged with surface extensions parallel to the resistive and transparent layer.

14. The combined display and input device as claimed in claim 1, wherein the virtual first input unit is configured to display a symbol of the function, and the virtual first input unit is configured to change a submenu of the function in response to a touch on the contact-sensitive monitor in the area of the symbol.

15. The combined display and input device as claimed in claim 1, wherein the contact-sensitive monitor is configured to generate at least one virtual control element corresponding to the selected function in response to the selection of the function by the press function of the combined control, and the virtual control element is configured to set a target value of the selected function.

* * * * *

UNITED STATES PATENT AND TRADEMARK OFFICE
CERTIFICATE OF CORRECTION

PATENT NO. : 9,552,088 B2  
APPLICATION NO. : 13/700402  
DATED : January 24, 2017  
INVENTOR(S) : Gert-Dieter Tuzar Page 1 of 1

It is certified that error appears in the above-identified patent and that said Letters Patent is hereby corrected as shown below:

On the Title Page

Item (56) (Foreign Patent Documents) German Patent No. DE 103962 38 3 T5 should correctly read as follows:
--DE 103 92 383 T5--

Signed and Sealed this
Twenty-fifth Day of April, 2017

Michelle K. Lee
*Director of the United States Patent and Trademark Office*